Patented Dec. 6, 1932

1,890,165

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

PROCESS FOR VULCANIZING RUBBER

No Drawing.      Application filed March 15, 1928. Serial No. 262,028.

The present invention relates to the vulcanization of rubber by an improved process wherein sulfurized derivatives of butylaldehyde aromatic primary amine reaction products are employed as accelerators of the vulcanization step. By sulfurized derivatives are meant those products formed by the reaction upon Schiff's bases or aldehyde derivatives of Schiff's bases with sulfur or sulfur-containing compounds without the elimination of hydrogen sulfid. The sulfurized products are preferably produced by the action of sulfur or of sulfur-containing compounds such as hydrogen sulfid, ammonium polysulfids, and the like, upon the reaction product of an aromatic primary amine with more than an equi-molecular proportion of butylaldehyde. The preferred means of manufacturing the compounds and their use as accelerators in the rubber vulcanization process will be understood from the following description and examples.

Aldehyde-amine reaction products, such as Schiff's bases, formed by the union of equimolecular proportions of an aliphatic aldehyde with a primary aromatic amine, and the aliphatic aldehyde derivatives of Schiff's bases have heretofore been described as desirable accelerators of the rubber vulcanization process. One compound of that type particularly effective for use in the said vulcanization process, is the butylaldehyde derivative of butylidene-aniline. Such a product was manufactured preferably by reacting substantially equi-molecular proportions of butylaldehyde and aniline at a temperature of approximately 72° C., and then treating the reaction product so formed with approximately from ½ to 3 molecular proportions of butylaldehyde to each molecule of butylidene-aniline taken. The mixture was maintained preferably at the refluxing temperature of butylaldehyde for about 20 hours, water of condensation was removed from the mass and the product was purified by vacuum distillation.

It has now been found that the butylaldehyde derivatives of butylidene-aniline and of like compounds when reacted with sulfur, or with sulfur-containing compounds, produce products which possess the common property of accelerating the rubber vulcanization process. The sulfur reaction product of the butyaldehyde derivative of butylidene-aniline was obtained by treating approximately one molecular proportion (264 parts) of the recation product of approximately two mols of butylaldehyde and approximately one mol of butylidene-aniline with approximately two molecular proportions (64 parts) of sulfur. (One molecular proportion (264) parts of the reaction product of approximately two mols of butylaldehyde and approximately one mol of butylidene-aniline as mentioned above and in all succeeding cases in this application is the weight of the product formed by reacting two mols of butylaldehyde with one mol of butylidene-aniline.) Reaction commenced immediately as was found by the warming up of the mixture caused by the evolution of heat. Substantially no hydrogen sulfid was evolved in the course of the reaction, thereby indicating that sulfur addition but no substitution had taken place. The reaction was completed by maintaining the product for several hours at a temperature between approximately 50 to 80° C. A dark colored, thick liquid product was obtained.

This product was compounded in a rubber mix comprising 100 parts of pale crepe rubber, 5 parts of zinc oxide, 3.5 parts of sulfur, and 0.5 parts of the accelerator described. The rubber mix was then cured by heating in a press for 45 minutes at the temperature given by 20 pounds of steam pressure to the square inch. The cured product, when tested, was found to possess a tensile strength at break of 3825 pounds per square inch, and an ultimate elongation of 840%. Another portion of the same mix was cured by heating under similar conditions for 15 minutes at the temperature given by 40 pounds of steam pressure per square inch. The cured rubber was found to possess a tensile strength at break of 3855 pounds per square inch and an ultimate elongation of 815%.

On carrying out a similar reaction between approximately one molecular proportion (264 parts) of the reaction product of approximately two mols of butylaldehyde and approximately one mol of butylidene-aniline with approximately two molecular proportions (64 parts) of sulfur at a higher temperature, for example between 130 and 140° C., hydrogen sulfid was evolved. A dark red colored viscous liquid was obtained. This product was incorporated in a rubber mix comprising.

100 parts of pale crepe rubber,
5 parts of zinc oxide,
3.5 parts of sulfur,
0.375 parts of the accelerator described.

The rubber mix was then cured by heating in a press for 30 minutes at the temperature given by 40 pounds of steam pressure per square inch. The cured product when tested was found to possess a tensile strength at break of 2525 pounds per square inch, and an ultimate elongation of 820%.

Another example of the preferred type of accelerators was obtained by treating approximately one molecular proportion (264 parts) of the reaction product of approximately two mols of butylaldehyde and approximately one mol of butylidene-aniline with approximately one molecular proportion (32 parts) of sulfur. The reaction was completed by maintaining the product for several hours at a temperature between 50 to 80° C. A deep red viscous liquid was obtained. This product was compounded in a rubber mix comprising 100 parts of pale crepe rubber,
5 parts of zinc oxide,
3.5 parts of sulfur,
0.375 parts of the accelerator described.

The rubber mix was then cured by heating in a press for different periods of time at the temperature obtained from 40 pounds of steam pressure per square inch. The following table shows the result of tensile tests obtained by testing sheets of rubber vulcanized in the hereinbefore stated manner.

| Time of cure mins. | Pressure lbs. steam | Modulus of elasticitys in lbs/in² at elongations of— | | | Tensile at break | Elongation at break |
|---|---|---|---|---|---|---|
| | | 300% | 500% | 700% | | |
| 10 | 40 | 145 | 287 | 986 | 2,155 | 860 |
| 20 | 40 | 215 | 523 | 1,940 | 3,140 | 800 |
| 30 | 40 | 239 | 612 | 2,425 | 3,000 | 730 |

On carrying out the reaction between approximately one molecular proportion (264 parts) of the reaction product of approximately two mols of butylaldehyde and approximately one mol of butylidene-aniline with approximately one molecular proportion (32 parts) of sulfur at a higher temperature, for example between approximately 130 and 140° C., hydrogen sulfid was evolved. A dark red colored viscous liquid was obtained. This product was incorporated in a rubber mix comprising 100 parts of pale crepe rubber,
5 parts of zinc oxide,
3.5 parts of sulfur,
0.375 parts of the accelerator described.

The rubber mix was then cured by heating in a press for 30 minutes at the temperature given by 40 pounds of steam pressure per square inch. The cured product when tested was found to possess a tensile strength at break of 2140 pounds per square inch, and an ultimate elongation of 850%. It is seen that while this material possesses accelerating properties, it is not as good an accelerator as the sulfurized product prepared at a lower temperature without the elimination of hydrogen sulfid or when a greater amount of sulfur is used in its preparation.

Other sulfurized reaction products of the aldehyde derivatives of a Schiff's base have also been prepared. Hydrogen sulfid, for example, has been passed through the butylaldehyde derivative of butylidene-aniline until complete reaction and saturation have taken place. The resulting product was found to possess vulcanization accelerating properties. Inasmuch as butylaldehyde commercially available ordinarily contains small proportions of butyric acid, it is desirable to neutralize any acidity present with an alkali, for example, ammonia, before passing the hydrogen sulfid into the product, although this neutralization step is not essential to the successful operation of the process.

The ammonium sulfid reaction product of a butylaldehyde derivative of butylidene-aniline has also been prepared. Thus, approximately 150 parts of concentrated ammonium hydroxide solution was saturated with hydrogen sulfid and approximately 35 parts of sulfur was dissolved therein. The yellow ammonium sulfid so obtained was then added to approximately one molecular proportion (264 parts) of the reaction product of substantially two molecular proportions (144 parts) of butylaldehyde upon substantially one molecular proportion (147 parts) of butylidene-aniline. This mixture was stirred continuously for a period of about seven hours during which time the mass was maintained at a temperature of approximately from 25 to 35° C. After a short time the mixture became much thicker and was finally allowed to settle. An oily layer separating from the water was withdrawn and dried in any suitable manner. The term "alkaline polysulfid" as used in the present specification includes those polysulfids of ammonia and the members of the alkali family.

The reaction product so obtained was then tested as a vulcanization accelerator by incorporating 0.5 parts of the product in a mix comprising

```
100  parts of rubber,
  5  parts of zinc oxide,
  3.5 parts of sulfur.
```

The rubber stock was then vulcanized by heating in a press maintained under the temperature given by 40 pounds of steam pressure per square inch. Portions of the stock vulcanized under the conditions set forth for different periods of time were tested, whereby it was ascertained that the optimum cure resulted after a vulcanization period of 30 minutes. The following table shows the results of tensile tests obtained by testing sheets of rubber vulcanized in the hereinbefore stated manner.

| Time of cure mins. | Pressure lbs. steam | Modulus of elasticity in lbs/in² at elongations of— | | | Tensile at break | Elongation at break |
| --- | --- | --- | --- | --- | --- | --- |
| | | 300% | 500% | 700% | | |
| 30 | 40 | 295 | 833 | 3,460 | 4,485 | 750% |

Results as given above demonstrate the production of a stock of high commercial qualities.

The examples hereinbefore set forth are to be understood as illustrative only and not at all limitative of the invention. Other ingredients and other proportions of ingredients than those particularly set forth may be employed for the manufacture of different types of vulcanized rubber goods. Moreover, the temperature, periods of vulcanization and other variable factors may be changed as is apparent to those skilled in the art. The invention is limited solely by the claims attached hereto as part of this application.

What is claimed is:

1. The process of vulcanizing rubber which comprises heating rubber and sulfur in the presence of a vulcanization accelerator comprising the sulfurized butyaldehyde derivative of butylidene-aniline.

2. The process of vulcanizing rubber which comprises heating rubber and sulfur in the presence of a vulcanization accelerator comprising the reaction product of an alkali polysulfid and a butylaldehyde derivative of butylidene-aniline.

3. The process of vulcanizing rubber which comprises heating rubber and sulfur in the presence of a vulcanization accelerator comprising the reaction product of ammonium polysulfid and a butylaldehyde derivative of butylidene-aniline.

4. The vulcanized rubber product obtained by heating rubber and sulfur in the presence of a vulcanization accelerator comprising the sulfurized butylaldehyde derivative of butylidene-aniline.

5. The vulcanized rubber product obtained by heating rubber and sulfur in the presence of a vulcanization accelerator comprising the reaction product of ammonium polysulfid and a butylaldehyde derivative of butylidene-aniline.

6. The process of vulcanizing rubber which comprises heating rubber and sulfur in the presence of a vulcanization accelerator obtained by heat-treating ammonium polysulfid and the butylaldehyde reaction product of butylidene-aniline.

7. The vulcanized rubber product obtained by heating rubber and sulfur in the presence of a vulcanization accelerator prepared by heat-treating ammonium polysulfid and the butylaldehyde reaction product of butylidene-aniline.

8. The process of vulcanizing rubber which comprises heating rubber and sulfur in the presence of a vulcanization accelerator comprising the reaction product of an alkaline polysulfid with the material formed by treating substantially one molecular proportion of butylidene-aniline with substantially two molecular proportions of butylaldehyde.

9. The vulcanized rubber product obtained by heating rubber and sulfur in the presence of a vulcanization accelerator comprising the reaction product of an alkaline polysulfid with the material formed by treating substantially one molecular proportion of butylidene-aniline with substantially two molecular proportions of butylaldehyde.

In testimony whereof I hereunto affix my signature.

WINFIELD SCOTT.